United States Patent [19]

Drower et al.

[11] 4,456,639
[45] Jun. 26, 1984

[54] LAMINATING FILM OF THERMOSET POLYESTER RESIN WITH EXTERNAL LAYER OF EMBOSSABLE THERMOPLASTIC RESIN

[75] Inventors: Herbert M. Drower, Wilmette; Morton Minkus, Winnetka, both of Ill.

[73] Assignee: Sealtran Corporation, Chicago, Ill.

[21] Appl. No.: 385,460

[22] Filed: Jun. 7, 1982

[51] Int. Cl.³ ............................................. A47G 1/12
[52] U.S. Cl. ....................................... 428/13; 428/35; 428/172; 428/174; 428/178; 428/189; 428/207; 428/347; 428/483; 428/900; 428/910; 428/916; 428/480; 283/107; 283/109; 229/3.5 R; 206/37
[58] Field of Search ............... 428/916, 172, 483, 480, 428/13, 174, 178, 189, 207, 347, 900, 35, 910; 360/2; 235/488, 493, 490; 283/107, 109; 229/3.5 R; 206/37

[56] References Cited

U.S. PATENT DOCUMENTS

| | | | |
|---|---|---|---|
| 3,412,493 | 11/1968 | French | 40/2.2 |
| 3,414,998 | 12/1968 | Berger | 40/2.2 |
| 3,545,380 | 12/1970 | Comegys et al. | 101/369 |
| 3,921,318 | 11/1975 | Calavetta | 40/2.2 |
| 4,041,206 | 9/1977 | Tsunashima | 428/409 |

FOREIGN PATENT DOCUMENTS 0026006 4/1981 European Pat. Off. .
1769510 9/1979 Fed. Rep. of Germany .
52-22075 2/1977 Japan .

OTHER PUBLICATIONS

Polaroid Corporation, "How to Use Polaroid Polaseal Pouches and Carriers for Polaroid Identification Systems", 12/1973.

Primary Examiner—Marion McCamish
Assistant Examiner—P. R. Schwartz
Attorney, Agent, or Firm—Kinzer, Plyer, Dorn & McEachran

[57] ABSTRACT

A transparent protective laminating film for forming a sealed protective cover on an identification card or similar document, comprising a base film of biaxially oriented thermoset polyester resin with an inner surface coating of polyethylene or other heat-and-pressure activated thermoplastic resin, has an additional outer surface layer of unoriented embossable thermoplastic polyester resin to permit embossure with a security pattern; the outer surface layer is also receptive to a signature strip formed by embossure, to a pigment signature strip or a resin-oxide magnetic strip applied by hot stamp transfer, or any combination of such strips.

16 Claims, 4 Drawing Figures

LAMINATING FILM OF THERMOSET POLYESTER RESIN WITH EXTERNAL LAYER OF EMBOSSABLE THERMOPLASTIC RESIN

BACKGROUND OF THE INVENTION

It has become common practice to protect various forms of identification cards and other documents, including driver's licenses, student identification cards, security system identification documents, and the like, by sealing such documents into covers formed of thin, tough, transparent plastic film. The best known protective film for this purpose is a laminate that includes an outer film of hard, tough, abrasion-resistant biaxially oriented thermoset polyester resin coated with an inner layer of a thermoplastic adhesive resin activatable by heat and pressure. The polyester resin for the base film is usually polyethylene terephthalate; the most frequently used thermoplastic adhesive resin is polyethylene. To complete a protective cover on an identification card or like document, the document is usually placed between two sheets of the laminating film and then passed through a laminating press in which heat and pressure are applied to activate the thermoplastic adhesive, bonding the film to the surfaces of the document; around the edges, the two film sheets may bond directly to each other.

A laminated assembly of this kind provides excellent protection for the identification document. The biaxially oriented polyester outer film effectively withstands a great deal of abuse. It remains hard, tough, and abrasion-resistant with little change due to aging; the transparency of the film is also little changed with age. The protective film makes it difficult to alter the identification card for purposes of fraud or forgery, although alteration can sometimes be effected by skillful, careful work.

Although highly effective and useful, identification documents protected by laminated covers of biaxially oriented polyester film have not been suitable for a number of applications. Thus, the biaxially oriented polyester film on the outer surface of a document assembly of this kind cannot be effectively embossed after lamination; indeed, it is extremely difficult to emboss at any time because the heat, pressure, and time requirements for effective embossure are excessive. Furthermore, it is difficult to obtain effective adherence between any supplementary external film and the surface of the hard polyester film. For example, in those applications in which it is desirable to provide a magnetizable strip on the protected document for the recording of an identification number or other security information, it becomes necessary to locate the magnetizable strip in the interior of the laminated document assembly. An inside location for a magnetizable strip is not desirable because the protective laminate increases the spacing between the strip and any recording or reading transducer. Moreover, with a protected document assembly of this construction, the document cannot be signed or otherwise validated by the user after lamination has been completed because the biaxially oriented base film on the outer surface of the document assembly does not accept ordinary inks; the ink wipes off.

SUMMARY OF THE INVENTION

It is a primary object of the present invention, therefore, to provide a new and improved protective laminate for identification cards and like documents that retains the advantages of a cover film of hard, tough, abrasion-resistant biaxially oriented polyester film, yet allows for surface embossure, for mounting of an external magnetizable strip, and for effective retention of a signature applied after completion of the protective lamination.

A further object of the invention is to provide a new and improved protective surface lamination for an identification card or like document, utilizing a base film of hard, tough, abrasion-resistant biaxially oriented polyester film, that permits lamination to be carried out with conventional equipment, yet allows for surface embossure, for application of an external magnetizable strip, and for an effective signature (validation) panel on the exterior of the protected document.

A specific object of the invention is to provide a new and improved transparent protective laminating film, in sheet or pouch form, with minimal additional expense as compared with conventional laminating films of hard, tough, abrasion-resistant biaxially oriented polyester resin, which nevertheless permits external embossure and which accommodates external magnetizable data strips and external strips for signatures or other forms of validation.

Accordingly, in one aspect the invention relates to a transparent protective laminating film for surface protection of an identification card or like document, comprising a base film of hard, tough, abrasion-resistant thermoset polyester resin, having a first layer, on one surface of the base film, formed of a thermoplastic resin adhesive that is activatable by heat and pressure to bond the laminating film to a document, and having a second layer, on the opposite surface of the base film, formed of an embossable thermoplastic resin, preferably a polyester resin, that is tough and abrasion resistant.

In another aspect, the invention relates to a laminating pouch for surface protection of an identification card or like document, comprising first and second transparent pouch elements joined to each other along a fold line; the first pouch element comprises a base film of hard, tough, abrasion-resistant thermoset polyester resin, an outer layer on the base film formed of an embossable thermoplastic resin that is tough and abrasion resistant, and an inner layer on the base film formed of a thermoplastic resin adhesive activatable by heat and pressure, and the second pouch element comprises a base film of hard, tough, abrasion-resistant thermoset polyester resin and an inner layer on the base film formed of a thermoplastic resin adhesive activatable by heat and pressure.

In a further aspect, the invention relates to an improvement in an identification card or like document assembly of the kind comprising a document covered by a composite transparent protective lamination including a base film of hard, tough, abrasion-resistant thermoset polyester resin with an inner layer of a thermoplastic resin adhesive that is activatable by heat and pressure, the protective lamination being bonded to the document by application of heat and pressure to bond the inner layer to the document; the improvement comprises an outer surface layer, covering the base film of embossable thermoplastic resin that is tough and abrasion resistant. The outer surface layer may have an embossed security pattern, which does not penetrate the base film, covering a substantial portion of the document surface. A roughened strip for a signature or other validation may be formed on the outer surface of the outer layer, by embossure; alternatively, a pigmented signature strip may be affixed to the outer surface of the outer layer. A strip of magnetic material may be affixed to the outer layer.

DESCRIPTION OF THE PREFERRED EMBODIMENTS

Figure 1:
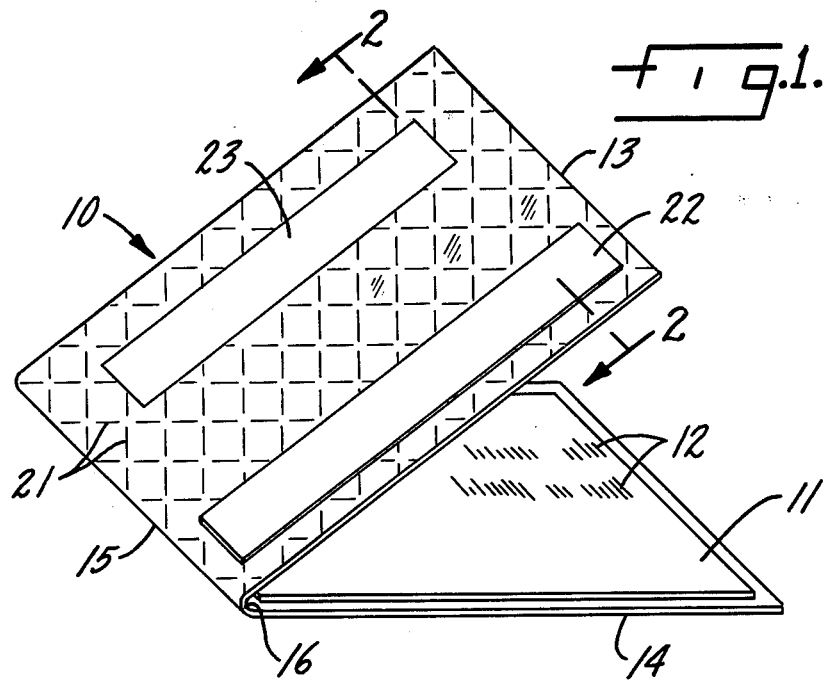
FIG. 1 is a perspective view of a protective laminating pouch for surface protection of an identification card or like document, utilizing a laminating film formed in accordance with the present invention.
Figure 2:
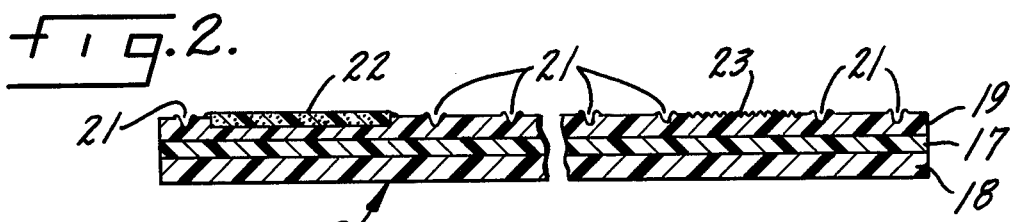
FIG. 2 is a detail sectional view taken approximately as indicated by line 2—2 in FIG. 1, with the thicknesses of individual layers of the laminating film greatly exagerated.

FIGS. 1 and 2 illustrate a laminating pouch 10 formed of a transparent protective laminating film made in accordance with the present invention, pouch 10 itself constituting one of the preferred embodiments of the present invention. Pouch 10 is utilized to provide a sealed transparent protective cover for both sides of an identification card or like document 11. Document 11 may comprise a driver's license, a student identification card, a security identification card, a credit card, or a wide variety of other such documents. Document 11 may bear appropriate identification data or other indicia 12 in printed, handwritten, typed, or other form. Document 11 may also include a photograph (not shown) imprinted on the base material of the document itself or inset as a separate element in the document.

Laminating pouch 10 comprises a first pouch element 13 and a second pouch element 14 joined to each other along a fold line 15. In pouch 10, elements 13 and 14 are formed from a single sheet of laminating film scored as indicated at 16 to provide for accurate folding of the pouch along line 15 to maintain both pouch elements 13 and 14 accurately aligned with the edges of document 11.

The construction of the laminating film utilized to form pouch elements 13 and 14 is best shown in the detail sectional view of FIG. 2, in which the thickness of individual films is greatly exaggerated. As shown therein, the laminating film used to form pouch 10 comprises a base film 17 of hard, tough, abrasion-resistant thermoset polyester resin. The preferred material for film 17 is biaxially oriented polyethylene terephthalate, the biaxial orientation of the film being achieved by stretching of the film. Film 17 is typically of a thickness of two mils, although a thicker film can be used if preferred.

The laminating film illustrated in FIG. 2 further comprises a first surface layer 18, on the inner surface of base film 17, formed of a thermoplastic resin adhesive that is activatable by heat and pressure to bond the laminating film to document 11. Typically, layer 18 is formed of polyethylene resin with a thickness of approximately three mils; again, a thicker adhesive layer can be used if preferred. The adhesive layer 18 may be applied to the polyester base film 17 by conventional extrusion techniques.

As thus far described, the laminating film utilized for pouch element 13, comprising base film 17 and adhesive surface layer 18, corresponds to the conventional laminates that have been utilized for a number of years in protective covers for identification cards and other like documents. In the construction shown in FIG. 2, however, there is a second surface layer 19 on the opposite surface of base film 17, and it is this second surface layer that affords the advantageous features of the present invention. The outer surface layer 19 is formed of an embossable thermoplastic resin that is tough and abrasion resistant; preferably, surface layer 19 constitutes an unoriented polyester resin, which may be either a co-polyester or an amorphous homopolymer. The outer surface layer 19 typically may have a thickness of approximately two mils, though again a thicker layer may be utilized if desired. The unoriented polyester surface layer 19 can be applied to the biaxially oriented polyester base film 17 by essentially the same extrusion techniques employed for application of the adhesive polyethylene layer 18 to the base film. In general, because the outer polyester layer 19 is a thermoplastic material, the ranges of temperatures, pressures, and speeds used in normal extrusion coating of other thermoplastic materials (e.g., polyethylene layer 18) onto base film 17 can be used effectively.

As noted above, the biaxially oriented thermoset polyester film used for base film 17 is extremely difficult to emboss; the temperatures, pressures, and embossing times required are generally prohibitive. However, this is not true of the unoriented thermoplastic polyester resin of outer layer 19. Consequently, it is readily possible to emboss the outer surface of pouch element 13 (and pouch element 14, if desired) with a repetitive security pattern 21. In FIGS. 1 and 2, security pattern 21 is shown as a series of interrupted lines. However, it is readily possible to emboss the security pattern in the form of a series of numbers, alphabetic characters, or any other desired design elements.

FIG. 1 shows the embossed security pattern 21 formed in the outer surface of pouch 10 prior to sealing of the pouch onto document 11. However, it is not essential that embossure precede sealing of pouch 10. Thus, to complete a protected identification card or like document, starting from the point illustrated in FIG. 1, pouch element 13 is folded down over document 11 and the pouch and document are then passed through a conventional laminating press that applies heat and pressure throughout the surface area of the pouch to soften the inner thermoplastic adhesive layer 18 and seal the two pouch elements 13 and 14 to the opposite surfaces of document 11. The security embossure 21 can be formed in the laminating press that completes sealing of the pouch to the document by providing appropriate embossing ridges or other elements on the rolls or platens of the laminating press.

It is also readily possible to emboss the security pattern 21 in the surfaces of pouch 10 after the pouch is completely sealed to document 11. However, this procedure may be less efficient because it requires additional processing, with appropriate embossing equipment, subsequent to the basic laminating procedure.

Laminating pouch 10 further includes a magnetic strip 22 on the outer surface of the external polyester layer 19, as shown in FIGS. 1 and 2. Strip 22 comprises a conventional film formed of a thermomagnetic oxide and a resin binder and is readily applied to the outer surface layer 19 by the hot stamp transfer process utilized to apply similar magnetizable strips to other thermoplastic materials in the manufacture of credit cards and the like. Strip 22 would not adhere to the biaxially oriented thermoset polyester resin of base film 17; as applied to the thermoplastic polyester resin of layer 19, however, adherence is excellent. Furthermore, the relatively "soft" nature of layer 19 allows the magnetic strip 22 to sink into layer 19 to a limited extent during the hot stamp transfer or like process used to apply the magnetic strip to pouch element 13, reducing any possibility that the magnetic strip may subsequently become detached from the completed laminated document assembly.

Laminating pouch 10 may also include a signature strip 23. In the embodiment of FIGS. 1 and 2, signature strip 23 is a roughened strip formed by embossure of a portion of the outer surface layer 19 of the pouch. Thus, strip 23 may be formed by embossure simultaneously with formation of the security pattern 21. A strip of sandpaper or like material incorporated in an embossing roll or platen affords an effective means for formation of signature strip 23. Of course, embossure of the signature strip can be carried out as a separate step independently of embossing of the security pattern 21. Because the roughened signature strip 23 is formed in the outer surface of the external thermoplastic polyester resin 19, it is far more ink receptive than the biaxially oriented thermoset polyester resin film 17 that would constitute the outer surface of a conventional laminating pouch or other film cover. Stated differently, the roughened strip 23 can serve effectively for the application of a signature or other validation after lamination when applied to the thermoplastic embossable layer 19, but would not be useful as applied to the thermoset polyester film 17.

The requirements for the laminating press used to seal the two elements 13 and 14 of pouch 10 to document 11 are readily met with laminating equipment heretofore used for conventional laminating films of thermoset polyester resin with polyethylene or like adhesive resin coatings on their interior surfaces. Thus, the platen temperature for the laminating press may be in a range of about 250° to 300° F. and lamination may be effected by passing the pouch and document assembly through the platen rolls at speeds in the range of two to ten feet per minute. The same heat and rate ranges can be maintained for embossure during lamination, with pressures comparable to those applicable with an ordinary household iron. If the security pattern 21 or other embossure of the surface of laminating pouch 10 is effected before lamination of the pouch to document 11, the depth of embossure may be reduced somewhat during final lamination; if made deep enough in the first place, however, it remains perceptible in the completed laminated document assembly.

Figure 3:
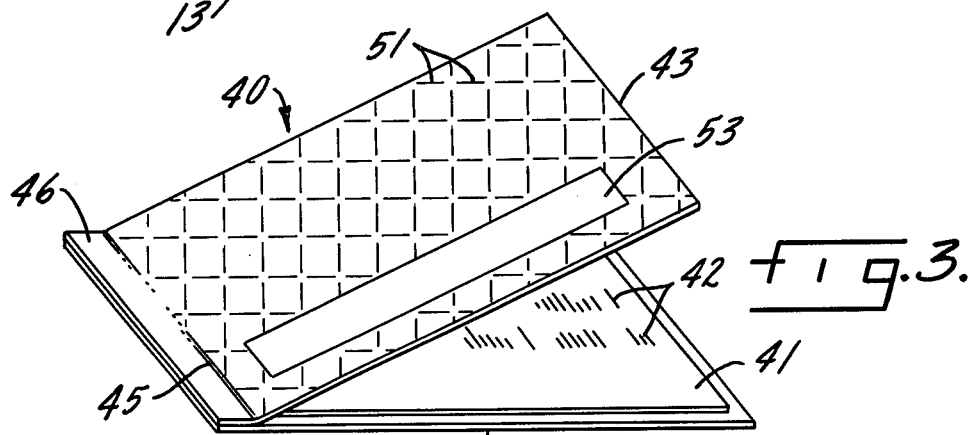
FIG. 3 is a perspective view of a protective laminating pouch constructed in accordance with another embodiment of the invention.
Figure 4:
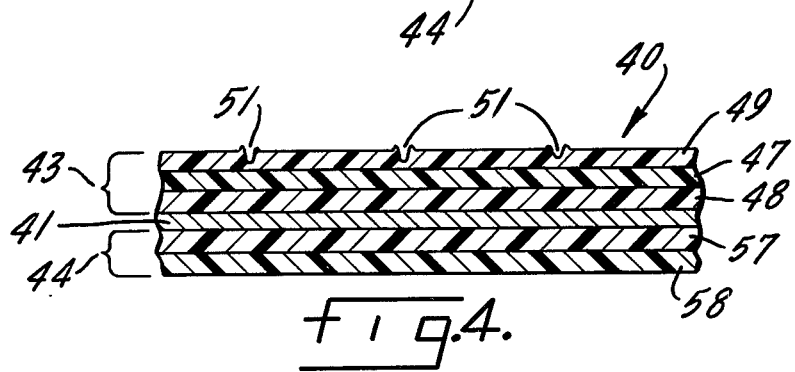
FIG. 4 is a detail sectional view of a completed document assembly, using the pouch of FIG. 3, with the thickness of individual films greatly exaggerated.

FIGS. 3 and 4 illustrate another embodiment of the present invention comprising a laminating pouch 40 to be utilized in forming a sealed protective cover for an identification card or like document 41 shown as including suitable indicia 42. Pouch 40 includes a first pouch element 43 joined to a second pouch element 44 along a fold line 45. In this instance, pouch elements 43 and 44 are formed from different laminating films and are heat-sealed to each other along an edge strip 46 that defines the fold line 45.

As best shown in FIG. 4, the upper pouch element 43 includes a base film 47 of hard, tough, abrasion-resistant biaxially oriented thermoset polyester resin. As in the first embodiment, the preferred resin for base film 47 is polyethylene terephthalate. A first coating or layer 48 of a thermoplastic resin adhesive that is activatable by heat and pressure for bonding to document 41 is extrusion coated or otherwise applied to one surface of base film 47. On the other surface of base film 47, at the outer surface of the pouch element 43, there is a layer 49 of an embossable thermoplastic polyester resin, also preferably applied by extrusion coating. Layer 49 is provided with an embossed security pattern 51 again shown as a relatively simple line pattern; however, it will be recognized that the embossed pattern 51 may include alphabetic characters, numerals, or any other desired design elements.

As shown in FIG. 3, the outer surface of pouch element 43 is provided with a signature or other validation strip 53. In this instance, signature strip 53 is a white pigment strip applied to the outer surface layer 49 (see Fig. 4) by the hot stamp transfer process. Thus, strip 53 corresponds to the type of signature strip frequently used in credit cards formed of vinyl and other thermoplastic materials.

Laminating film 44, in pouch 40, comprises a base film 58 of hard, tough, abrasion-resistant biaxially oriented thermoset polyester resin, preferably polyethylene terephthalate. The inner surface of base film 58 is coated with a thermoplastic resin activatable by heat and pressure comprising the layer 57. Polyethylene is the preferred adhesive resin. The thicknesses for elements 47–49, 57 and 58 may be the same as those specified above for the corresponding films and coatings in the embodiment of FIGS. 1 and 2.

Utilization of pouch 40 in forming a sealed protective cover for document 41 is carried out in the same manner as described above for pouch 10. Pouch 40 is folded over document 41 and the resulting assembly is passed through a conventional laminating press operating at a temperature preferably in the range of about 250° to 300° F. at a speed of the order of two to ten feet per minute. The security pattern 51 can be embossed in the outer surface layer 49 of pouch element 43 before, during, or after lamination.

The outer layers of embossable thermoplastic polyester resins used in the laminating films of the present invention are not as hard as the thermoset polyester resins used for the base films, nor are they as resistant to abrasion. Nevertheless, these outer surface layers are quite adequate for the desired characteristics of toughness and abrasion resistance, particularly when backed up by the thermoset polyester resin base films on which they are supported. Two specific thermoplastic polyester resins that are suitable for the outer surface layers 19 and 49 are Petra Type HS homopolymer polyester resin supplied by Allied Chemical Corporation and Kodar Type PET-G copolymer polyester resin supplied by Eastman Chemical Corp. These resins, and others of the same general type, permit effective surface embossure for security purposes and for signature strips. Further, they provide effective acceptance of magnetic strip material or signature strips of pigment when applied to the surface layer by inexpensive conventional techniques, particularly hot stamp transferring.

In the drawings, the laminating films 17–19 and 47–49 are shown in the pre-cut, pre-formed pouches 10 and 40, respectively. It will be recognized, however, that these laminating films are equally suitable for use in continuous strip form, with individual sections cut from the strips after lamination to the documents being protected. Moreover, though roll lamination is described, the laminating films of the invention are equally well adapted to use in flat platen laminating presses and can be embossed in such presses.

We claim:

1. A laminating pouch, sealable by heat and pressure, for surface protection of an identification card or like document, the pouch having an outer surface that is embossable at temperatures and pressures suitable for heat sealing of the pouch and that is receptive to hot stamp transfers, the pouch comprising:

first and second transparent pouch elements joined to each other along a fold line, each pouch element comprising a laminate of an inner layer, a base layer, and an outer layer;

the inner layer being formed of an unoriented thermoplastic resin adhesive activatable for sealing by pressure when heated to a temperature within a range of about 250° to 300° F.;

the base layer being formed of a hard, tough, abrasion resistant biaxially oriented thermoset polyester resin that is highly resistant to embossure in the heat sealing range of the inner layer;

and the outer layer being at least as thick as the base layer and being formed of an unoriented thermoplastic polyester resin that is tough and abrasion resistant by that is embossable in the heat sealing range of the inner layer.

2. A protective laminating pouch for document protection, according to claim 1, in which the adhesive resin of the inner layer is polyethylene.

3. A protective laminating pouch for document protection, according to claim 1 or claim 2, in which the base layer has a thickness of at least two mils, the inner layer has a thickness of at least three mils, and the outer layer has a thickness of at least two mils.

4. A protective laminating pouch for document protection, according to claim 1, or claim 2, in which the outer layer of the first pouch element is embossed, throughout a substantial portion of its surface area, with a repetitive security pattern which does not penetrate the base film.

5. A protective laminating pouch for document protection, according to claim 1, or claim 2, and further comprising a strip of magnetic material affixed to and at least partially embedded in the outer surface of the outer layer of one pouch element.

6. A protective laminating pouch for document protection, according to claim 5, and further comprising a roughened sugnature strip formed by embossure of the outer surface of the outer layer of one pouch element.

7. A protective laminating pouch for document protection, according to claim 5, and further comprising a pigmented signature strip affixed to the outer surface of the outer layer of one pouch element.

8. A protective laminating pouch for document protection, according to claim 1, or claim 2, and further comprising a roughened signature strip formed by embossure of the outer surface of the outer layer of one pouch element.

9. A protective laminating pouch for document protection, according to claim 1, or claim 2, and further comprising a pigmented signature strip affixed to the other surface of the outer layer of one pouch element.

10. In an identification card or like sealed document assembly of the kind comprising a document covered by and sealed into a laminated transparent protective film including a base layer of hard, tough, abrasion resistant biaxially oriented thermoset polyester resin that is highly resistant to embossure and an inner sealing layer of an unoriented thermoplastic resin adhesive activatable for sealing by pressure when heated to a temperature within a range of about 250° to 300° F., the protective film being sealed by application of heat and pressure to activate the inner layer and seal the inner layer to the document, the improvement comprising an outer surface layer at least about as thick as the base layer, covering the base layer, of an unoriented thermoplastic polyester resin that is tough and abrasion-resistant but that is embossable in the heat sealing range of the inner layer and that is receptive to hot stamp transfers.

11. An identication card or like laminated document assembly, according to claim 10, in which the base layer is polyethylene therephthalate and the thermoplastic resin of the inner adhesive layer is polyethylene.

12. A identification card or like document assembly according to claim 10, or claim 11, in which the base layer has a thickness of at least two mils, the inner layer has a thickness of at least three mils, and the outer layer has a thickness of at least two mils.

13. An identification card or like document assembly, according to claim 10, or claim 11, and further comprising a strip of magnetic material affixed to and at least partially embedded in the outer surface of the outer layer.

14. An identification card or like document assembly, according to claim 10, and further comprising a roughened signature strip formed by embossure of the outer surface of the outer layer.

15. An identification card or like document assembly, according to claim 10, and further comprising a pigmented signature strip affixed to the outer surface of the outer layer.

16. An identification card or like document assembly, according to claim 10, or claim 11, or claim 14, or claim 15, in which the outer surface layer on at least one side of the assembly is embossed with a security pattern which does not penetrate the base film, the security pattern covering a substantial portion of the document surface.

* * * * *